(12) United States Patent
Onnestam

(10) Patent No.: US 9,097,305 B2
(45) Date of Patent: Aug. 4, 2015

(54) BRAKE LEVER FOR A BRAKE FOR A VEHICLE

(71) Applicant: Kjell Onnestam, Loddekopinge (SE)

(72) Inventor: Kjell Onnestam, Loddekopinge (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 13/772,051

(22) Filed: Feb. 20, 2013

(65) Prior Publication Data

US 2013/0160601 A1    Jun. 27, 2013

Related U.S. Application Data

(63) Continuation of application No. PCT/EP2010/005280, filed on Aug. 27, 2010.

(30) Foreign Application Priority Data

Aug. 20, 2010  (DE) .......... 20 2010 011 587

(51) Int. Cl.
| | |
|---|---|
| F16D 65/56 | (2006.01) |
| F16D 65/60 | (2006.01) |
| F16H 21/44 | (2006.01) |
| C22C 37/10 | (2006.01) |
| F16D 125/64 | (2012.01) |

(52) U.S. Cl.
CPC ............ *F16D 65/60* (2013.01); *C22C 37/10* (2013.01); *F16H 21/44* (2013.01); *F16D 2125/64* (2013.01); *F16D 2200/0013* (2013.01); *Y10T 74/20582* (2015.01)

(58) Field of Classification Search
USPC ............ 148/321; 420/27; 188/71.7–71.9, 188/72.7–72.9, 79.55, 196 BA
See application file for complete search history.

(56) References Cited

U.S. PATENT DOCUMENTS

| | | | |
|---|---|---|---|
| 3,392,810 A | 7/1968 | Svensson | |
| 6,866,726 B1 * | 3/2005 | Suzuki et al. | 148/321 |
| 7,794,650 B2 * | 9/2010 | Igarashi et al. | 420/9 |
| 2010/0239451 A1 * | 9/2010 | Horie et al. | 420/15 |

FOREIGN PATENT DOCUMENTS

| | | |
|---|---|---|
| EP | 0598290 A1 | 5/1994 |
| EP | 0553105 B1 | 11/1994 |
| EP | 1064472 B1 | 1/2001 |
| WO | 9207202 A1 | 4/1992 |
| WO | 2004/059187 A1 | 7/2004 |

OTHER PUBLICATIONS

International Search Report and Written Opinion of the International Searching Authority Application No. PCT/EP2010/005280 Completed: Apr. 11, 2011; Mailing Date: Apr. 27, 2011 7 pages.

(Continued)

*Primary Examiner* — Christopher Schwartz
(74) *Attorney, Agent, or Firm* — St. Onge Steward Johnston & Reens LLC

(57) ABSTRACT

A brake lever for a brake of a vehicle for transmitting a brake force from an actuator into a brake actuation mechanism for a frictional engagement of brake pads, wherein the brake lever includes a housing made of cast iron, which cast iron is solid-solution strengthened ferritic spheroidal graphite cast iron.

13 Claims, 1 Drawing Sheet

(56) References Cited

OTHER PUBLICATIONS

Dr. Richard Larker; "Solution Strengthened Ferritic Ductile Iron ISO 1083/JS/500-10 Provides Superior Consistent Properties in Hydraulic Rotators"; Dec. 4, 2009; Retrieved from the Internet: URL: http://www.foundryworld.com/uploadfile/200912443017589.pdf; Retrieved on Apr. 11, 2011; pp. 343-351.

* cited by examiner

BRAKE LEVER FOR A BRAKE FOR A VEHICLE

FIELD OF THE INVENTION

This invention refers to a brake lever for a brake for a vehicle for transmitting a brake force resulting from an actuator to a brake actuation mechanism to achieve frictional engagement of brake pads.

In particular, this invention refers to a special composition of material of such brake levers.

BACKGROUND OF THE INVENTION

On heavy road vehicles, bosses, trailers and similar drum brakes as well as disc brakes are employed which comprise brake lever, respectively. For example, disc brakes with a corresponding lever arrangement are known from EP 0 553 105 B1 or WO 2004/059187 A1 of the applicant. However, the invention in particular concentrates on drum brakes in which the brake lever attaches an S-camshaft and which comprises a housing which receives an automatic brake (or slack) adjuster, as this is exemplarily disclosed in EP 0 598 290 B1 and EP 1 064 472 B1 of the applicant or in U.S. Pat. No. 3,392,810.

The brake lever for such drum brakes serves to transform the linear movement of a rod from a pneumatic or hydraulic actuator to a rational movement of a shaft of such a drum brake assembly in order to apply with the brake linings of the brake shoes during brake actuation. The brake lever itself is preferably made as one piece and comprises a housing section into which an automatic slack adjuster arrangement is received in order to provide compensation of the wear of the brake shoes of the drum brake. With respect to the exact functioning of the automatic slack adjuster arrangement and brake lever in this context it is, for example, referred to EP 0 598 290 B1 of the applicant.

The brake lever thus have to be considered as being the crucial component of the entire arrangement with respect to the dynamic and static applied loads as present in such a drum brake. Generally, the brake lever is configured as an elongated device with a housing section into which the automatic slack adjuster arrangement is inserted, and with a lever section which comprises a free end being connected with the actuator.

So far, the brake lever and in particular the housing for receiving the brake adjuster normally have been made of spheroidal graphite cast iron, which is existing with different ferritic and pearlitic grades, which means that the base material of the cast iron consists of ferrite to pearlite. Spheroidal graphite in this context means that the free carbon is formed embedded in a ferrite- and/or pearlite matrix in spherical, i.e. globular or nodular form. At this it is a specific form of deposition of the carbon in a spherical form, i.e. as compared to steel, carbon is not directly embedded in the elementary cell of the iron but forms differently shaped faces of graphite within the alloy.

Herewith a larger percentage of pearlite in the matrix provides an increased hardness and strength, while a larger percentage of ferrite deals a better ductility and better machining properties.

Instead of cast iron the housing of brake lever according to the prior art can be also made of forged steel.

The housing or the housing section of the brake lever in which the slack adjuster arrangement is arranged comprises several internal surface sections which are supposed to large contact pressure and wear, since elements of the brake adjuster arrangement do abut against these sections, use these sections as an abutment as corresponding supporting or a bearing faces for movable components of the brake adjuster arrangement.

For that reason it is required to provide hardening and heat treatment to these internal surfaces. This connection, for example, also nitriding of these services is employed. Such hardening procedures are very costly. Moreover such hardening procedures require chemicals which have negative impacts on the environment and both on the safety and welfare of the workers during the industrial manufacture to a substantial extend.

The free end of the brake lever is connected with a rod of a pneumatic or hydraulic actuator in that a bold is passing through a hole in the upper lever section and a clevis of the actuator rod. The hole in the upper lever section is often reinforced in that a bushing is pressed into it which is able to provide a better wear resistance against the friction effects during brake actuation. Also this additional manufacturing step with the additional component is negatively influencing the overall costs of the manufacture of such a brake lever.

SUMMARY OF THE INVENTION

Generally, it is an object of the present invention to provide a brake lever for a brake which can be made with less costs on the one hand and which provides substantially better material properties with respect to both the machining and the working cycle and functional safety on the other.

A further object of the invention is to dispel the deficiencies for brake levers known in the field of drum brakes.

These objectives are solved by a brake lever according to the appended claims.

Accordingly, the quintessence of the invention is that the housing of the brake lever is made of solid-solution strengthened ferritic spheroidal cast iron. Preferably the brake lever is made of such cast iron in one piece.

Solid-solution strengthened ferritic spheroidal cast iron is a type of cast iron in which the spheriodal graphite is embedded in a matrix which predominantly consists of ferrite and which predominantly solidified from silicon solid solution. Carbon is predominantly present in the form spheroidal graphite particles. Compared to ferritic to pearlitic graphite cast iron the solid-solution strengthened ferritic grades present for an equivalent tensile strength a higher proof strength and an overall higher elongation.

A significant advantage of these solid-solution strengthened ferritic grades is the reduced hardness variation resulting in an improved machinability for components made of such cast iron. In other words, the level of the mechanical properties of such components is determined by the extend of these solid-solution strengthening of the ferritic matrix of the cast iron used therefore, which extend intern normally is influenced by the silicon content.

Preferably the maximum pearlite content in the matrix of the cast iron, which predominantly consists of ferrite, is in the area of 5%.

According to the invention the cast iron for the brake lever shall comprise a tensile strength $R_m$ between 400 and 650 MPa, preferably of 600 MPa.

Preferably the 0.2%-proof stress $R_{p0.2}$ is an arrange of 70% to 90%, preferably of 80% of the tensile strength $R_m$.

According to the invention the cast iron shall comprise a hardness in HBW (hardness according to Brinell) which corresponds to a range between 42% and 50% of the 0.2&-proof stress $R_{p0.2}$ in MPa.

Moreover, according to the invention the cast iron shall have an elongation A between 8% and 18%, preferably between 10% and 12%.

For providing such properties a solid-solution strengthened ferritic spheroidal graphite cast iron can be used which is known under the material denomination EN-GJS-600-10/5.3110 according to the preliminary European standard. It has a tensile strength $R_m$ of 600 MPa, a 0.2%-proof stress $R_{p0.2}$ of 470 MPa, a hardness of 200 to 230 HBW and an elongation A of 10%.

When comparing this solid-solution strengthened ferritic graphite spheroidal cast iron with conventional spheroidal graphite cast iron used nowadays one would select with respect to a better machinability a spheroidal graphite cast iron with the material denomination EN-GJS-500-7/5.3200 which comprises a tensile strength $R_m$ of 500 MPa and a hardness of about 150 to 230 HBW. However, with respect to the 0.2%-proof stress $R_{p0.2}$ of 320 MPa and elongation A of 7%, this cast iron shows less favourable properties which are apposed to an easy machinability. Whereas, if spheroidal graphite cast iron is selected which comprises a 0.2%-proof stress $R_{p0.2}$ of 480 MPa with a tensile strength $R_m$ of 800 MPa, also less favourable figures with respect to a hardness of 245 to 335 HBW and an elongation A of only 2% are shown. Such a cast iron, for example, would be known under the material denomination EN-GJS-800-2/5.3301.

Also crucial for the invention is the fact that this solid solutions strengthened ferritic graphite spheroidal cast iron comprises a silicon content between 3% and 4.5%. As already mentioned above, it is mainly increased strength over a conventional spheroidal graphite cast iron which is achieved by the solid-solution strengthening at a very large silicon content. Conventionally an enhanced strength in the cast iron was achieved by increasing the proportion of pearlite in the matrix, which, however, in term contravenes to an easy machinability of such materials.

It is an advantage of the invention is a better balancing between the machining properties on the one hand and the strength on the other for a planned component made of solid-solution strengthened ferritic spheroidal graphite cast iron.

Machinability mainly is determined by the hardness of the hardest spots within the components to be machined. It may be very hard spots within the cast iron where the material is harder due to cooling time etc. as compared to the adjacent area (macro area). Moreover, very small, locally limited hard spots in the micro area can exist which are formed due to the non-homogenous structure of the material of the graphite cast iron. In contrast solid-solution strengthened ferritic spheroidal graphite cast iron presents a much more homogenous structure as conventional types of cast iron, which comprises these spots and sections of different hardness at a micro-scale. As the proportion of these areas is influenced by cooling time etc., conventional cast irons show large variations between the hardest and the softest spots.

For conventional cast irons with conventional ferritic and pearlitic proportion is also an disadvantage that always in the area close to the surface a thin layer of material with a reduced content of pearlite is formed which, matter of fact, reduces the usable strength, since the spots with the softest material are the ones mainly determining the usable strength of a component.

For that reason it is a common approach of constructing engineers to start with setting an upper limit for the hardness for a component to be casted under the provision to avoid problems and high cost associated therewith, at the subsequent machining. Based on this hardness the constructing engineer then selects corresponding material and after that finally defines the actually useable strength calculations.

In case the construction engineer will use solid-solution strengthened ferritic spheroidal graphite cast iron according to the invention he will thus end up with a significantly higher usable strength for the component to be casted as this would be the case for conventional spheroidal graphite cast iron.

It is obvious that a substantially higher strength can be realized for a brake lever according to the invention when using solid-solution strengthened ferritic spheroidal graphite cast iron, whereby at the same time the machinability is within ideal arranges.

BRIEF DESCRIPTION OF THE DRAWINGS

All purposes of illustrating the invention, enclosed FIGS. 1 and 2 show a brake lever for a drum brake which FIG. 1 is a lateral view of the brake lever with partial cross section and FIG. 2 is a cross section along A of FIG. 1.

DETAILED DESCRIPTION OF THE INVENTION

Figure 1:
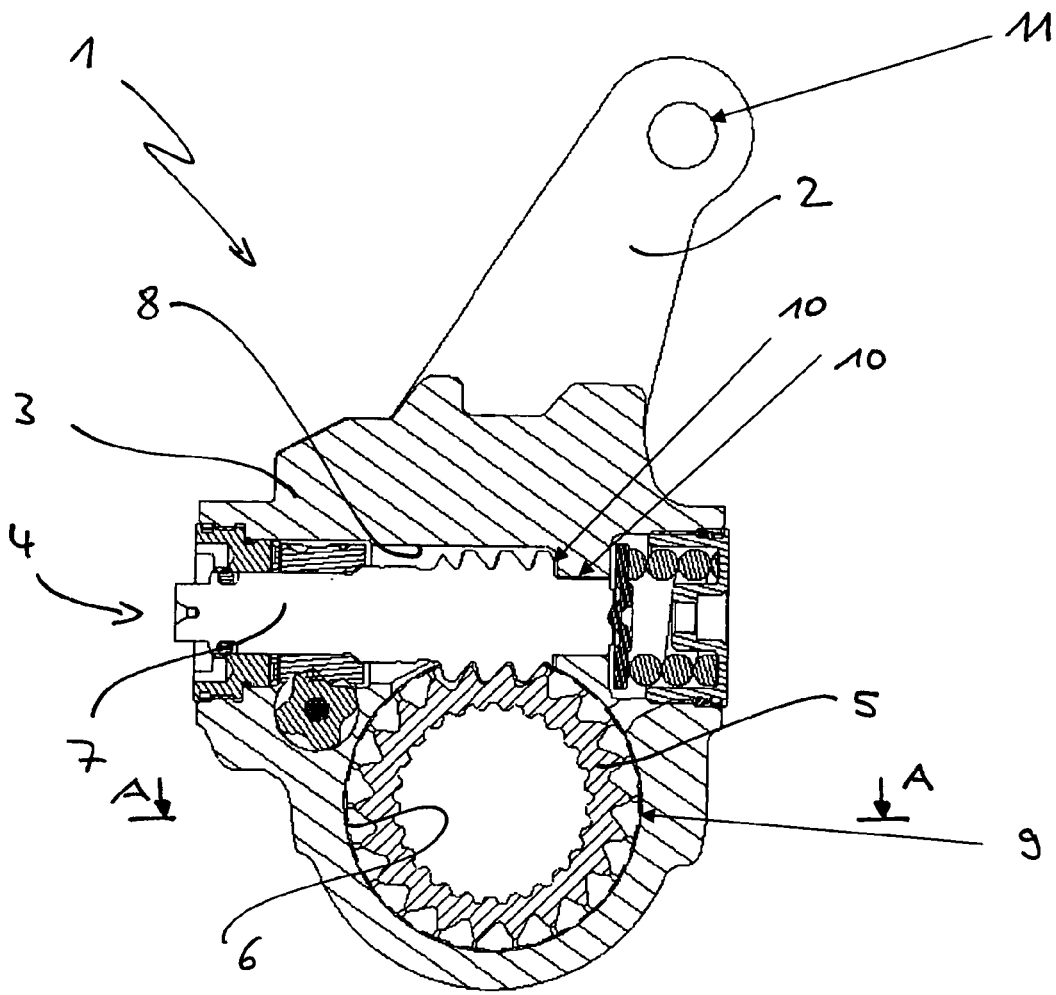
Figure 2:
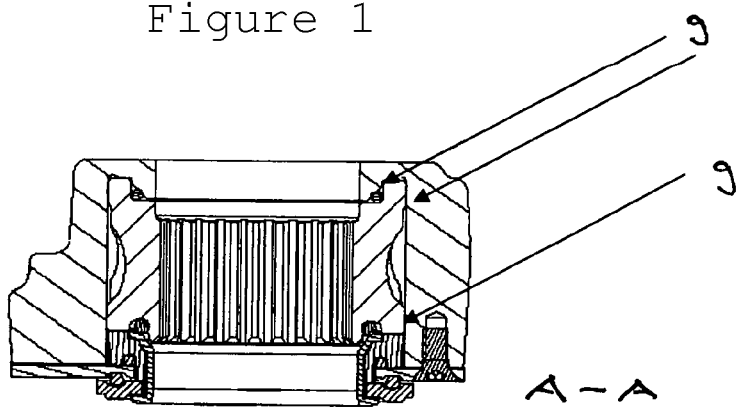

Brake lever 1 is made as one piece and comprises and upper lever section 2 and a lower housing section 3 for receiving an automatic slack adjuster arrangement 4.

A warm wheel 5 of the slack adjuster arrangement 4 is rotatably received in a corresponding recess 6 of the housing section 3 and cooperates with corresponding inner spine grooves of a S-camshaft (not shown) for the brake pads. The worm wheel 5 engages with a worm screw 7 which is supported in the housing section 3 perpendicular to the worm wheel 5 in a corresponding recess 8.

With reference to the type and functioning of the remaining components of the automatic slack adjuster arrangement, which shall not be addressed further herein, it is referred to EP 0 598 290 B1 of the applicant.

As it becomes obvious, the recess 6 for the worm wheel 5 comprises corresponding inner support bearing surfaces 9, as well as the recess 8 for the worm screw 7 comprises corresponding bearing surfaces 10.

At this inner bearing surfaces 9, 10 a large contact pressure is existent, so that these bearing surfaces till know have to undergo corresponding hardening procedures, such as for example nitriding, with the disadvantages of an increased environmental burden and cost disadvantages associated therewith as mentioned already above.

When using solid-solution strengthened ferritic spheroidal graphite cast iron, which compared to conventional ferritic or pearlitic types of the same strength, as explained above, comprises a higher useable strength, thus higher resistance against very high pressure loads, in particular in the spot area, will be applied without deforming plastically.

In particular with respect to the inner bearing surfaces 9, 10 in the housing section 3 of the brake lever 1 for a drum brake the use of solid-solution strengthened ferritic spheroidal graphite cast iron according to the invention is of particular advantage since the mentioned subsequent hardening procedures can be omitted completely. All together, machining at the bearing surfaces 9, 10 can be performed more easily.

In the upper area of the lever section 2 the hole 11 is provided which serves for a connection with a rod (not shown) of an actuator. Therefore, a bold passes through the hole 11. Due to the relative movements between the bold of the rod and the hole 11 of the lever section 2 upon a swivelling movement of the brake lever 1 an corresponding resistance against the friction resulting therefrom has to be provided in order to keep aware small, so that often the hole 11 is reinforced in better corresponding hardened bushing is pressed into the hole for brake levers to the prior art.

Since the solid-solution strengthened ferritic spheroidal graphite cast iron for the same hardness comprises a better usable strength it will be also not necessary anymore to provide an additional bushing for the hole 11, since the inner surface of the hole 11 already is such presence a substantially large resistant to the pressure contact of the bold without deforming. As a consequence the costs can be further reduced by assembly time and by omitting an additional bushing.

It is self explaining that the brake lever, be it for a disc brake or be it for a drum brake, is a substantial safety critical component of the entire brake arrangement, since in case of malfunction, for example possible brakeage of a brake lever, complete loss of the braking function for the corresponding wheel may occur. Cast iron which comprises similar machining properties and which have similar 0.2%-proof stress as the cast iron according to the invention are, however, as already mentioned above several times, less homogenous and show more casting defects which then can be the sources of growing cracks. Such a brakeage risk, however, will be eliminated by the far more homogenous structure of the solid-solution strengthened ferritic spheroidal graphite cast iron, so that its use qualifies in particular for a brake lever.

The recesses 6 and 8 with its cylindrical surfaces do show slightly larger dimensions as the worm wheel 5 and the worm screw 7, so that these cylindrical surfaces will elastically and plastically deform during brake actuation when high forces are applied to them by the worm wheel 5 and the worm screw 7, respectively. Due to the worse machinability often variations in the dimensions or also casting defects occur in using conventional cast irons. Due to the lower ductility when compared to the cast iron according to the invention such defects lead to the risk of cracking formation during the deformation. Moreover, such risk is increased since hardening of the corresponding bearing surfaces 9, 10 further reduces the ductility.

Deformations which result from the pressure applied by the worm wheel 5 and the worm screw 7, respectively, can be better compensated by way of the higher ductility of the surrounding material of the bearing surfaces 9, 10 when using the cast iron according to the invention for the lever 1, so that such crack formations during the deformation can be excluded.

Furthermore, it is also an advantage of the solid-solution strengthened ferritic spheroidal graphite cast iron according to the invention that the required proportion of the carbon solidified in not use or spheres can be substantially reduced when compared to ferritic and pearlitic types in order to fulfil the minimum tensile properties. In the manufacture of spheroidal graphite cast iron, the carbon is forced to solidify in the shape of spherical nodules instead of in the form of flakes as in grey cast iron. If the nodularisation fails in some way or cannot be completely performed, the cast iron will be more brittle and is inclined thereby to course crack formation more easily, by which the risk for brakeage is increased.

Such deficiencies in the manufacture of material of corresponding components are eliminated when using solid-solution strengthened ferritic spheroidal graphite cast iron which in particular increases the safety in the application for a brake lever substantially.

What is claimed is:

1. A brake lever for a brake of a vehicle for transmitting a brake force from an actuator into a brake actuation mechanism for a frictional engagement of the brake pads, wherein the brake lever comprises a housing of cast iron, characterized in that the cast iron is solid-solution strengthened ferritic spheroidal graphite cast iron and wherein the cast iron comprises a tensile strength $R_m$ between 400 and 650 MPa.

2. The brake lever according to claim 1, in which the cast iron comprises a 0.2%-proof stress $R_{p0.2}$ between 70% to 90% of the tensile strength $R_m$.

3. The brake lever according to claim 2, in which the cast iron comprises a hardness between approximately 117 HBW and approximately 293 HBW.

4. The brake lever according to claim 2, in which the cast iron comprises a 0.2%-proof stress $R_{p0.2}$ of 80% of the tensile strength $R_m$.

5. The brake lever according to claim 1, in which the cast iron comprises an elongation A between 8% and 18%.

6. The brake lever according to claim 5, in which the cast iron comprises an elongation A between 10% and 12%.

7. The brake lever according to claim 1, in which the matrix of the cast iron predominantly contains ferrite with a maximum pearlite content of 5%.

8. The brake lever according to claim 1, in which the brake is a drum brake and the brake lever is provided for the connection to a S-camshaft, wherein the housing comprising a housing section which receives a brake adjuster arrangement.

9. The brake lever according to claim 1, in which the brake is a disc brake and the brake lever attaches to a force transmitting element being axially displaceable towards the brake disc.

10. The brake lever according to claim 1, in which the cast iron comprises a tensile strength $R_m$ of 600 MPa.

11. The brake lever according to claim 1, in which the cast iron comprises a silicone content between 3% and 4.5%.

12. The brake lever according to claim 1, in which the cast iron comprises a hardness between approximately 176 and approximately 270 HBW.

13. The brake lever according to claim 1, in which the cast iron comprises a hardness between approximately 200 and approximately 230 HBW.

* * * * *